United States Patent [19]

Rigstad

[11] 4,092,386

[45] May 30, 1978

[54] BATTERY ENVELOPING WITH FOAM

[75] Inventor: Dennis A. Rigstad, Warsaw, Ind.

[73] Assignee: W. R. Grace & Co., Cambridge, Mass.

[21] Appl. No.: 594,454

[22] Filed: July 9, 1975

[51] Int. Cl.² .......................................... B29D 27/00
[52] U.S. Cl. ................................ 264/46.5; 264/46.6; 264/54; 264/261; 264/323; 429/139
[58] Field of Search ............ 264/46.5, DIG. 83, 46.6, 264/261, 54, 46.4, 323; 136/143, 146, 147; 429/139

[56] References Cited

U.S. PATENT DOCUMENTS

| 2,707,202 | 4/1955 | Chubb ................................ 136/147 |
| 2,995,614 | 8/1961 | Krueger ........................... 136/147 X |
| 3,201,280 | 8/1965 | Yumoto ............................ 136/147 X |
| 3,340,100 | 9/1967 | Silvestri ........................... 136/146 X |
| 3,630,819 | 12/1971 | Conger ............................ 264/46.5 X |
| 3,703,417 | 11/1972 | Rosa et al. ....................... 136/147 X |
| 3,872,198 | 3/1975 | Britton .............................. 264/46.6 |
| 3,919,371 | 11/1975 | Jache ........................... 264/DIG. 83 |

FOREIGN PATENT DOCUMENTS

| 451,628 | 8/1936 | United Kingdom. |
| 1,110,221 | 4/1968 | United Kingdom ................ 264/46.4 |
| 1,115,974 | 6/1968 | United Kingdom ................ 264/45.3 |
| 1,166,768 | 10/1969 | United Kingdom ................ 264/46.4 |

*Primary Examiner*—Philip Anderson
*Attorney, Agent, or Firm*—Edward J. Hanson, Jr.; C. E. Parker

[57] ABSTRACT

A battery separator envelope is provided having two walls of battery separator connected together by a foam member. In a method, two walls of battery separator are secured on a mandrel by sandwiching the mandrel and the walls of battery separator in a jig. A foam bead is then extruded between the walls and the bead is tamped and squeezed to complete the final formation of the foam member. The apparatus includes the mandrel, jig, extruder and support for guiding the jig assembly past the extruder.

8 Claims, 3 Drawing Figures

BATTERY ENVELOPING WITH FOAM

BACKGROUND OF THE INVENTION

This invention relates to forming battery separator envelopes for enveloping battery plates and more particularly to securing battery separator walls together to form battery separator envelopes.

In the past it has been the practice to form battery separator envelopes by interconnecting walls of battery separator through the means of adhesives, hot melts, tape or when the battery separator material was appropriately sealable through heat seals and ultrasonic sealing. In all of these instances, using the previous practices, it was usual to either butt the edges of the battery separator together where it was to be joined or to lap them over one another. It has also been the practice in the past to directly cast battery separator tubes or to sew tubes from fabric and then impregnate the fabric.

It has surprisingly been found that through the present invention the walls may be spaced from each other and interconnected through a foam member and yet no additional space is lost within the battery without deleteriously affecting the free flow area of the battery separator available to the battery electrolyte.

One prior enveloping method used with the positive plates of lead acid industrial batteries involved placing glass mats over the faces of the battery paste and then wrapping the plate around its narrow dimension with a tape of glass sliver. Then a PVC sheet is wrapped over the tape, overlapped and sealed. The PVC sheet has perforations mechanically poked in it where the paste is and is solid at the edges of the plate to reduce moss or edge shorts. The bottom edge (open edge opposite the battery post) is then inserted into a plastic shield that fits over the rectangular bottom of the PVC wrapping.

SUMMARY OF THE INVENTION

By an aspect of the invention a battery separator envelope is provided for enveloping battery plates. The envelope has two walls of battery separator secured in spaced apart position by a foam member. In its preferred form the two walls are relatively flat, rectangular walls extending parallel to and in alignment with one another and joined at one of their adjacent edges by being a continuous homogeneous sheet extending across or through two folds with a base portion or edge wall inbetween. The continuous sheet therefore has much the same shape as the cover on a book with the edge wall extending at an angle of substantially 90° from each of the two walls. Preferably, the foam member secures the two walls together for at least substantially the entire length of two of their aligned edges, forming a seal with the walls. Thus only a single edge of the envelope is left open for access to the battery plate. Except for the pole connection even this could be substantially closed with the foam member. Venting, of course, would have to be adequate. The preferred battery separator has pores of less than 0.07 microns and the foam member is comprised of a synthetic polymer which bonds to the porus walls bonding tightly with the porus surface forming a mechanical bond therewith,.

Of course, an aspect of the invention includes a battery plate in position in the battery separator envelope of this invention. In its preferred form the combination contemplates a battery plate having a frame around its periphery enclosing the battery grid which is pasted with battery paste with two outwardly disposed faces exposed for battery electrolyte. A paste support mat preferably covers each of the two pasted faces of the battery plate and the foam member engages and extends through the interstices of at least two opposite edges of each of the support mats.

By another aspect of the invention a method is provided for forming battery separator envelopes for battery plates. The method basically involves positioning the two walls of battery separator adjacent to one another and spaced from one another and placing the active foam member in the space between the adjacent walls in contact with each of the walls. Preferably the two walls are spaced from one another by a mandrel which stops short of their outer edges to leave a channel for receiving the active foam member. Rigid supporting members extend along at least one of the outer edges of each of the two walls of battery separator on their sides opposite the mandrel to prevent the active foam member from pushing the two walls away from one another as it fills the channel. The mandrel may be the battery plate that is to be enveloped.

Most preferably the two walls of battery separator are sized to completely cover and extend beyond the pasted faces of the battery plates with the exception of any projecting connecting pole that may be present. The two rigid supporting members are preferably part of a jig that is of substantially the same size and rectangular shape as the two walls of battery separator. The rigid supporting members are interconnected so that they can be clamped in engagement with the battery separator walls in alignment with the edges of the battery separator walls, to support the walls in parallel spaced apart position and trapped against the mandrel to form a firm assembly with them and the mandrel for receiving the foam member.

Preferably the foam member is applied by extruding a foam bead from an extruder die into the channel formed between the edges of the battery separator walls and the mandrel beginning at the base portion of the battery separator sheet and moving in a substantially straight line to the outer end of one straight edge of the aligned edges of a rectangular side of the battery separator walls by moving the assembly passed the extruder die. The preferred method includes taping the foam firmly into the channel and smoothing the surface of the foam exposed at the surface of the channel by pressing with a flat surface. Thereafter the active foam member is cooled to a foam member and any flash is trimmed. Most preferably the foam is comprised of a polyethylene and is compounded with a heat activated blowing agent prior to being introduced into the extruder and is extruded as a hot melt.

The invention in yet another aspect contemplates equipment especially adapted to most expeditiously carry out the method and produce the products described in this application as more fully described hereinafter.

DRAWINGS

EQUIPMENT

Figure 1:
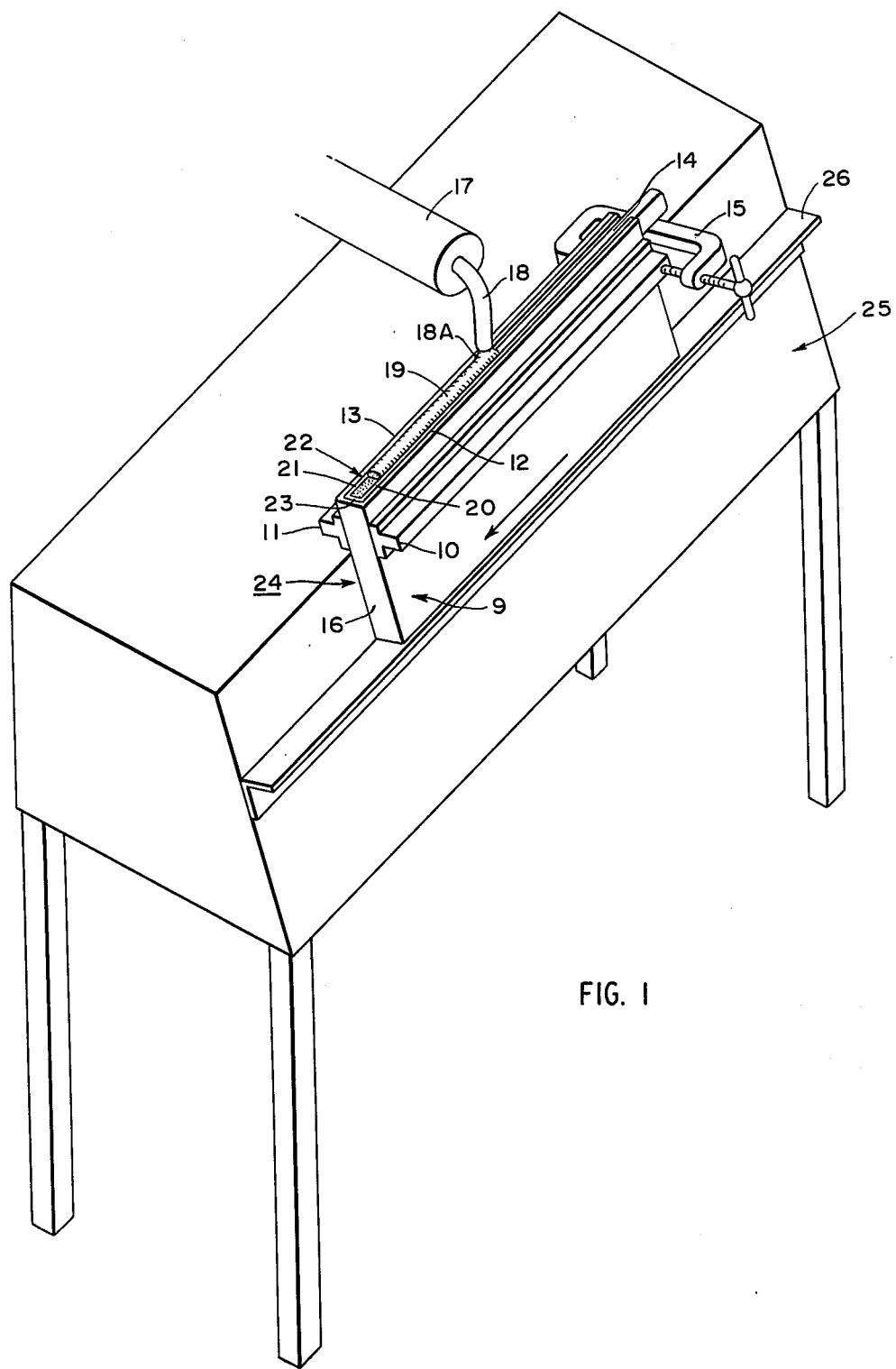
FIG. 1 is an isometric view of the apparatus of the present invention in operation with a small portion of the foam bead cut away adjacent base 23.

The apparatus of the present invention in a presently preferred form may be briefly outlined as follows: Looking at FIGS. 1 and 2, a jig 9 is shown having strengthening bars 10 and 11 along the corresponding opposite upper edges of its outwardly opposite facing two jig sheets or sides 12 and 13. the strengthening members 10 and 11 are spaced slightly below the upper edges of the sides. The strengthening members are T shaped bars for rigidity against flexing when the foam presses outwardly against the corresponding opposed edges of sheets 12 and 13. A mandrel 14 is also shown. The mandrel may be a battery plate. As shown in the Figures the mandrel 14 is a battery plate and 14A of FIG. 2 is the battery plate post. A C-clamp 15 is provided for positively securing the open end of the jig in spaced position. The jig itself is a single piece of sheet metal bent medially in a shape much like that of a book cover. The portion joining or hinging the outer sides or covers 12 and 13 is the base or hinge portion 16. The inherent spring nature or bias of the spring metal urges it to spread somewhat to an open position where it is folded.

Figure 2:
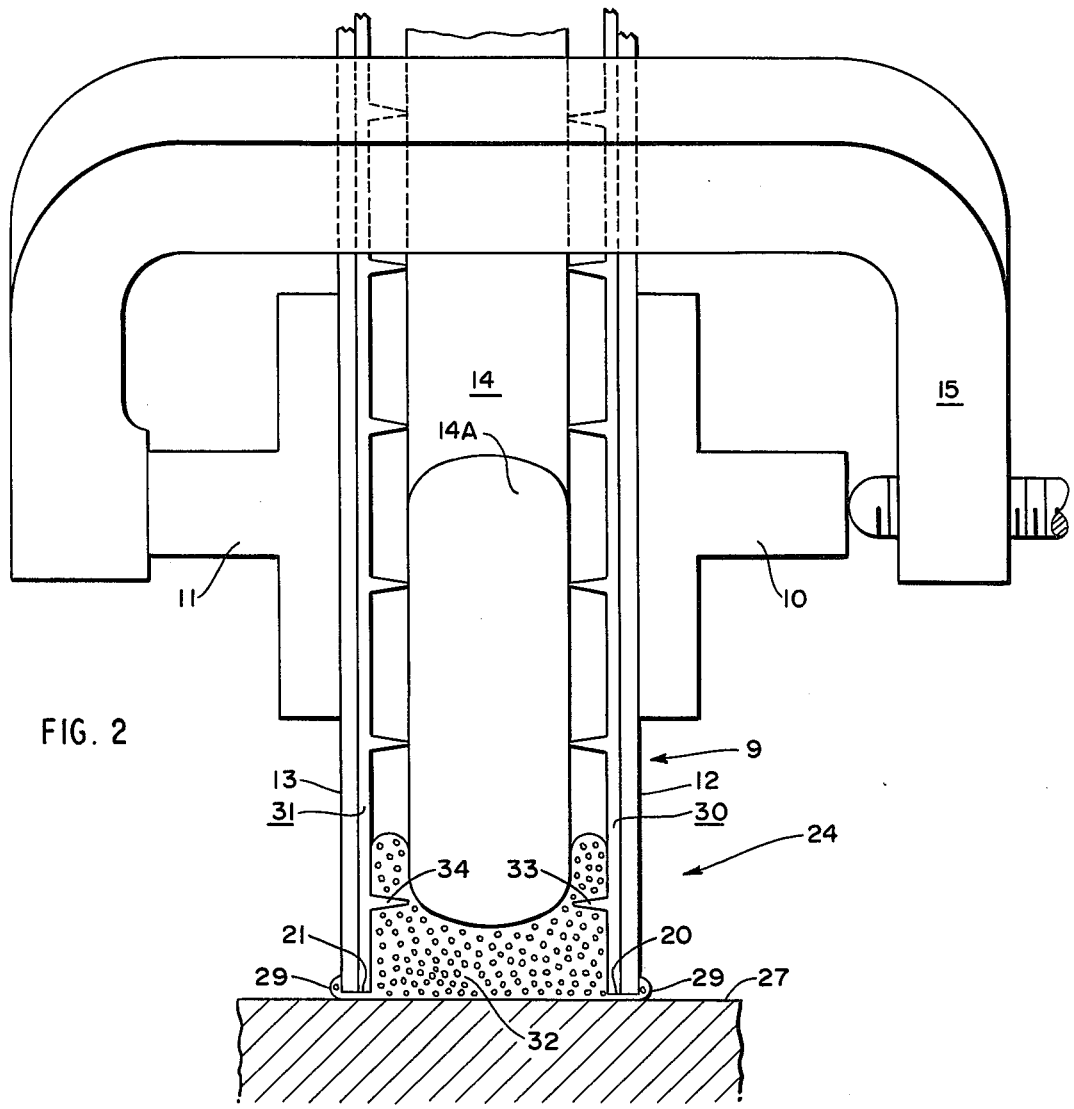
FIG. 2 is a partial end view of the jig assembly of the present invention showing the active foam member being tamped and smoothed.

An extruder 17 is shown in FIG. 1 for extruding a foamable polymer through a narrow throated die 18. The polymer exits at 18A to form a foam bead 19 over the mandrel 14 bridging the outer edges 20 and 21 of a battery separator which is bent in the same general shape as the jig 9. The two sides or sheets 12 and 13 of the jig are sized to correspond with the size of the battery separator sheets to be clamped on the mandrel as shown in FIGS. 1 and 2 to make it easy to align the top edges of sides 12 and 13 of the jig with edges 20 and 21 of a battery separator 22. The battery separator 22 also has a base or fold region 23. The jig 9 when assembled or loaded with a battery separator and a mandrel is a loaded jig assembly or a jig assembly 24.

A work table guide 25 is provided adjacent the extruder dies outlet 18A for receiving and positioning the jig assembly 24 for movement past the die outlet with the spaced apart battery separator sheet foam bead 19. A guide bar 26 extends across a medial region of work table or stand 25 and provides a proper spacing for the jig assembly 24 for receiving the foam bead 19 when the jig assembly 24 has its bottom edge securely engaged there against. The upper edge of the work stand 25 stops short of the upper edge of the jig assembly 24 to allow for passage of the C-clamp 15 and the strengthening member 11 thereabove. Thus the flat face of sheet 13 of the jig 9 is engaged against the flat face of the stand 25 so that the assembly will be stable as it is slid across the stand 25 for placement of bead 19.

A second flat surfaced work table or smoothing surface 27 is positioned adjacent the stand 25 and used to press or tamp the foam bead inwardly and against the mandrel to smooth its outer surface and assure an even secure seal and binding with the walls of the battery separator. The only other piece of equipment shown may be seen in FIG. 3 and this is the knife 28. Knife 28 is used to trim flash 29 from the edges of the separator 22 after the separator has been removed from the jig assembly.

PROCEDURE

The method of the present invention in a presently preferred form contemplates preparing the extruder for operation and plalcing it in operation and preparing a jig assembly by clamping battery separator sheeting on the mandrel with two sheet edges adjacent to one another but spaced apart for receiving foam extrudate between them.

To prepare the extruder a synthetic polymer resin, preferably a polyolefin and most preferably polyethylene is compounded with a blowing agent, which is preferably a heat activated blowing agent. The compounded synthetic polymer is fed into an extruder and extruded as a hot melt typically at a temperature in excess of 300° F at the die outlet. Thus the synthetic polymer hot melt is of the class commonly called a foaming thermoplastic resin composition and such terminology is considered synonymous. Of course, it is possible to introduce the foaming agent into the synthetic polymer in the extruder in some instances.

The jig assembly is also prepared. First, when the battery separator is sufficiently flexible to fold without being excessively damaged it is preferable to take a sheet of battery separator that is sized appropriately and fold the sheet much like a book cover so that two walls of battery separator that will form two walls of the envelope covering the pasted faces of the battery plate extend from a base portion at an angle of 90°. In the usually preferred form the two separator walls are identical in size and are arranged parallel to each other over the mandrel which may be the battery plate itself. The edges of the walls extend slightly beyond the edges of the mandrel where the walls are to be secured together by the active foam member. This provides a channel above the edge of the mandrel for receiving the foam member. Of course, the battery separator walls could be discrete sheets rather than composed of a single folded sheet. in the presently preferred embodiment, however, a single sheet is folded to form the two walls. If there are ribs present on the battery separator that cross the fold lines it may be highly desirable to remove or break the ribs at the folds to alleviate stresses. This may be done by cold or hot pressing the ribs to mash them down or by crimping the fold enough to bend the rib out of the way without significantly damaging or breaking the separator sheet. The preferred battery separator would be a microporus sheet formed from synthetic polymer resin, preferably from polyolefin and most preferably polyethylene. The preferred battery separator would be that sold under the registered trademark DARAMIC by W. R. Grace & Co. which is made under U.S. Pat. No. 3,351,495.

Figure 3:
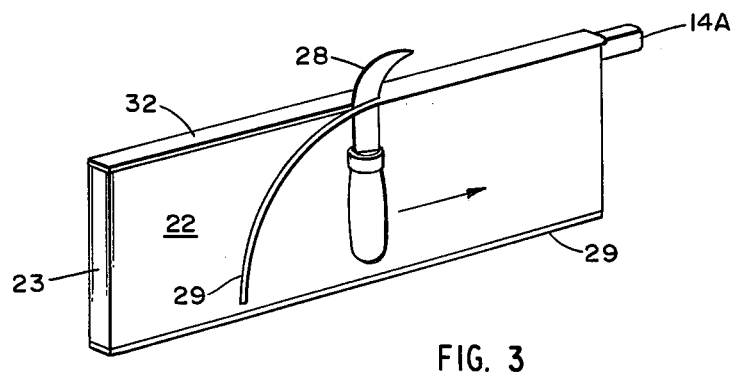
FIG. 3 is an isometric view of the enveloped battery plate of the present invention with the flash being cut away.

After the sheet of battery separator has been folded and positioned over the mandrel which is the battery plate in the case shown in FIGS. 1, 2, and 3, the subassembly is positioned in the jig. It is most convenient to place the base 23 of the battery separator on a flat surface with the leaves or walls 30 and 31 spread apart in the vertical position and to then insert the battery plate edge against the base in centered position with the desired margins at each edge to allow for thickness of foam. Preferably a paste supporting mat is placed over each of the two opposite outwardly pasted faces of the battery plate before the battery plate is positioned in the battery separator. The paste support mat is preferably the same size as the outer edges of the frame of the battery plate. However, the mat does not extend up toward any extensions or projections from the battery plate such as battery poles or posts. The mats have not been shown in the drawings for the sake of clarity. The jig preferably has its hinged portion seated on a flat surface with its sides or leaves 12 and 13 in open position for receipt of the subassembly battery separator and battery plate in the same manner as the battery plate was inserted into the battery separator. The sides of the jig are brought into exact registration with the edges of the battery separator. The hinged jig is then closed and secured in closed position to hold the separators against the battery plate or mandrel. This may desirably be done by means such as a C-clamp as illustrated in FIG. 1. Having thus positioned the battery plate within the side walls of the battery separator in the desired position and secured the edges of the separator from being pushed outwardly by the foam sealing material everything is in order for placing the foam in position.

The extruder has previously been placed in operation in one preferred form of this invention and the jig assembly has been prepared and is ready to receive the active foam member. In a preferred form this is done by placing the base 23 of the battery separator at the outlet 18A of the die and moving the assembly to the left as shown in facing FIG. 1. The speed of movement is determined by the visual observance of foam completely filling the space between the two battery separator sheets 12 and 13. The assembly is moved until the foam extends to the tops of the channel walls all the way to the remote edge of the sides of the battery separator walls in a straight line. The assembly is moved by sliding it in a straight line along the guide bar 26 with the face of side 13 against the support surface of the table 25. The strengthening bar 10 and the C-clamp are clear of the upper edge of the surface of the support table 25.

Immediately after the bead 19 has been placed, the assembly is positioned with the bead face down against a smooth surface and pressed against the smoothing surface as at 27 in FIG. 2. The excess extrudate is thereby forced into the seal. Thereafter, in some instances, the sealed edges may be pressed inwardly very slightly by manual pressure against the edges of the plates 12 and 13 to further assure a positive seal and the elimination of voids remaining after the foam has been tamped and smoothed. Of course, in some applications it may not always be necessary to even press the foam against or with a surface such as surface 27.

After the seal is finished it is cooled and the jig removed. The subassembly battery plate and battery separator are reversed so the still open channel on the opposite side is positioned at the side of the jig adjacent the strengthening bars 10 and 11. The jig is again secured over the subassembly and the procedure is repeated to seal this open channel edge of the walls 12 and 13 beginning again at the base 23. After tamping and squeezing and cooling in the same manner previously described the now sealed subassembly enveloped battery plate is removed from the jig and any flash may be removed by, for example, cutting as illustrated in FIG. 3.

A careful study of FIG. 2 reveals that the active foam member not only swells, comming into contact with the walls 20 and 21 of the battery separator, but also penetrates inwardly alongside the battery plate.

The battery plate typically has a frame extending therearound enclosing the battery grid which is pasted with battery paste with two outwardly disposed faces exposed for battery electrolyte. The active foam member flows around the outer edge of the frame, which acts as a heat sink (in the usual practice of the invention where the frame is not preheated) "freezing" the active foam and causing it to pull back very slightly from the edge of the frame leaving a very slight gap. The active foam member engages the edges of the paste support mat extending into or through the interstices of the edges and thereby bonding therewith. It may be recalled that the paste supporting mats are not shown. FIG. 2 reveals that this penetration is along the edge of the battery plates edge is in good measure due to the spacing of the main wall of the separator from the battery plate by the ribs projecting outwardly and impinging against the battery plate. The ribs 33 and 34 are actually encompassed in the active foam member. The paste support mats are usually only employed when the ribs space the back web or main separator surface from the paste. In addition the synthetic polymer actually penetrates right into the pores of the preferred type of battery separator forming a very good mechanical bond even when the pores are the preferred small pores of less than an average of 0.07 microns. The significant entry and superior mechanical bond in such small pores are truly remarkable. A second preferred embodiment would involve pores averaging up to 2.0 microns. Of course, the invention is also applicable to uses with battery separators having very large pores. The battery separator walls could of course be dissimilar.

When a removable mandrel is used in place of the battery plate it is usually preferable to omit the paste support mats. The removable mandrel is usually longer than the battery plate to facilitate its removal. Of course, the removable mandrel is also preferably smooth surfaced and made of a material to which the active foam member will not adhere so that it may be easily removed. It has been found that a preferred mandrel may be made of steel. When hot foam of synthetic polymers such as polyethylene contact the metal it has been found that it is cooled by the metal which acts as a heat sink and the foam shrinks back slightly making the mandrel's removal relatively easy.

In the particular embodiment here depicted in detail a continuous feed and extrusion extruder is used and all set up and handling is to be done off line so that the extruder may be continuously used. If a stop/start operation on each envelope is desired, a ram feed unit would be preferred. Any method may be employed in appropriate circumstances for applying the foam over the mandrel edge between the edges of the battery separator walls 20 and 21 as shown in FIGS. 1 and 2. It is however preferred that a polyolefin be employed with the blowing agent activated by heat within an extruder. The blowing agent and polyethylene can be dry blended and fed into the extruder hopper in the desired proportions. The extrudate can be directed from an appropriate die opening an a bead into the space between the edges of the battery separator walls or sheets.

Chemical foaming agents are preferred but other foam techniques may be employed. For example, the foam can in certain circumstances be mechanically formed in the extruder by mixing a gas into the polymer under pressure. It is important that the foam expand as it is placed, to assure proper void free sealing of the separator. In addition the foam member could in some circumstances be applied other than by extrusion. For example, a foamable material might be placed in the channel and foamed in place.

PRODUCT

The product of the present invention is an envelope for battery plates. Two spaced apart battery separator walls 30 and 31, as shown in FIGS. 1, 2, and 3, are joined together at their outer edges 20 and 21 by foam member 32 which is the smoothed up bead 19. Of course, the walls 30 and 31 are actually a continuous homogeneous strip of battery separator material joined by base 23 as may be seen in FIG. 1. This need not always be true, this being only a preferred form. The sheets could be discrete and separate members in proper instances.

One important feature of this invention is foam forming a mechanical adhesive bond with the battery separator. It is believed that this is by actual penetration into the pores of the battery separator, even pores smaller than 0.07 microns. In any event the mechanical bond is greatly superior to a mere surface or chemical adhesive bond. Furthermore the foam flows and intrudes not only into the pore of the battery separator but also around protrusions such as ribs 33 and 34 to further lock with the preformed battery separator. When the foam member is separated from the preferred microporus battery separator, which is very difficult to do, it has a covering of minute hair like fibrils on its surface. These fibrils are believed due to a stretching of the polymer material where it remains locked with the surface of the battery separator. Thus the mechanical adhesion is a very observable feature of this invention. The fact that the foam flows around the ribs is also significant in increasing the adhesive lock. The integrity of the sealing of the envelope is greated inhanced by the foam not only flowing but pushing as it expands into any voids at the sheet margins.

It may be seen that in its most preferred form (as shown in the Figures) the separator envelope has at least two walls that have aligned sides secured by a foamed member having two parts on opposite sides of the envelope starting at opposite edges of the base portion 23. The two parts of the foam member extend along the opposite edges of the battery plate. The rib structures adjacent the edges of the battery separator engaged by the foam member run parallel with the edges secured by the foam member. Preferably the battery separator that this invention would be most valuable with would be the non-cellulosic separators. Particularly preferred would be those comprised of a synthetic polymer and in particular one that has pores of less than 0.2 microns and more especially one with pores of less than 0.07 microns. The preferred foam member is a synthetic polymer preferably polyolefin and more preferably polyethylene.

By active foam member it is meant the foam, before it has been hardened (in the present instance by cooling) to the extent that it can no longer be permanently deformed and shaped by, for example, pressing it against a flat surface as in FIG. 2.

The extruder illustrated in the present embodiment is a single screw continuous extrusion type. Other types could be used. For discontinuous operation a ram type extruder could be used. With the continuous type extruder it would be contemplated that a number of set ups (jigs and mandrels) would be available and set ups would be done so as to allow for continuous use of the extrudate.

The paste support mat is commonly the glass mat which may include a tape of glass sliver. The common function of the paste support mat is to mechanically reduce shedding of positive material under abusive operating conditions.

By average pore size it is meant that the majority of the pores have the recited size as determined by the peak if the pore size distribution as measured by the Desorption Isotherm method using a Micro Meritics Digisorb-Model 2500 with the BET method.

The frame of the battery plate is the outer perimeter of the battery plate. Usually it is the positive battery plate that is enveloped and the negative battery plate is placed in between the enveloped positive battery plates. However, in some instances the negative battery plate is enveloped rather than the positive battery plate. In still other instances a block of several battery plates may be enveloped. For example, two battery plates with a battery separator between them and a battery separator on the outside of the pair of plates may be secured in a jig. This would form two channels, one channel above each battery plate edge. Then an active foam member could be placed on the two channels in the manner previously described. It would also be possible to extrude one wide foam bead and place it in both channels at the same time. The two battery envelopes could be joined through the common battery separator wall separating adjacent positive and negative battery plates. The foam member would extend along the separate channels in two parts each part joined to the same common battery separator wall between the positive and negative battery plates. A further extension of this concept would be enveloping all of the plates in an element, thus forming a mechanically unitary block or battery cell element.

A special embodiment of the invention that saves on the quantity of foam required to form the foam member is provided by shaping the jig so that its upper edges push the edges of the battery separator walls substantially closer together, narrowing the channel. Thus less foam is required to fill the channel.

The following examples further illustrates the nature and advantages of the present invention.

EXAMPLE I

A positive battery plate for a lead acid battery is enveloped using the process set out below. The battery plate is 16½ inches long (when lying on its side edge as shown in FIG. 1) and 5¾ inches high with a post extending about 1 inch from one of the short edges. The battery plate is about ¼ inch thick. A sheet of DARAMIC battery separator DIJH-334 (a product of W. R. Grace & Co.) is cut to a size of 33⅝ inches × 6 inches. This separator has ribs such as those illustrated in FIG. 2 running the long deminsion of the battery separator and spaced ¼ inch apart on center. To form the two walls 30 and 31 and the base portion 23 from the battery separator sheet that is 33⅝ inches long, the sheet is folded to provide a medial base edge portion 23 that is ½ inch across and two walls one on each side of the base, each of which are 16 14/16 inches long. To releave rib stress in the area where the ribs fold the 33⅝ inches long sheet of battery separator is positioned over two bars that have ⅛ inch diameters and are ½ inch apart on center with the ribs running across the bars. The battery separator is then hydraulically pressed against the bars with a platen at a pressure of 5 pounds/sq.in to cold press the ribs and mash them down. The cold pressing forms a line across the battery separator sheet such that when the sheet is turned over with the ribs up and the walls 30 and 31 are lifted by hand they naturally fold where the bars pressed to form the desired book cover shape.

The battery plate with one paste support mat on each face is then seated against the separator base 23 with the post extending away from the base 23. The plate is centered with respect to the other two edges of the battery separator walls 30 and 31. This is most easily done with the base 23 resting on a table or the like.

The subassembly of the battery separator and battery plate are then positioned in the jig 9 with base 23 against the hinge portion 16 of the jig. The edges of the jig exactly conform in size to the edges of the battery separator walls and provide support and protection to the battery separators' edges. After the edges of the separators are aligned with the edges of the jig a C-clamp 15 is engaged on the strengthening bars 10 and 11 to hold the sides 12 and 13 of the jig in position parallel with one another and clamp the battery separator against the mandrel or battery plate 14.

As a separate procedure two parts per hundred of foaming agent, KEMPORE 200 (a product of National Poly Chemical, Inc. ) is dry blended with Exxon LD 610 polyethylene (a product of Exxon) in a drum tumbler. This blend is then charged into the hopper of a small extruder (14 ½:1 L/D, 2 inch Royal extruder) and extruded at a barrel temperature of about 400°–450° F. through a die made out of ⅛ inch copper tubing. The polyethylene's density is about 1.00. The density of the foam is about 0.35.

With the extruder operating, the jig assembly 24 is placed at the right hand edge of the slanted table face (looking at FIG. 1) resting on the bar 26 with the back face of sheet 13 flat against the slanted table surface and positioned with the die outlet 18A at the very beginning of the channel opening which is at the base 23 of the battery separator. Then the assembly 24 is slowly moved by sliding it by hand across the surface of the table resting and traveling along bar 26 at such a speed that the extruder outlet supplies a foam bead 19 completely filling the channel space above the plate 14 and between the side edges 20 and 21 of the battery separator. The jig assembly 24 is moved to the left (looking at FIG. 1) until it is beyond the die outlet 18A and then quickly lifted and the bead is pushed or tamped inwardly by being pushed down against a flat surface such as a table as shown in FIG. 2. This smooths up the bead's outer surface so that it does not have ripples bulging outwardly which would consume space within a battery. This also assures complete and uniform contact by the foam throughout the channel deminsions at the edge of the separator. The assembly is then allowed to cool at ambient of about 70° F for a few minutes to complete the formation of the foam member. The C-clamp is then released and the battery separator and the battery plate subassembly are removed from the jig. Any flash is cut from the edges of the battery separator as illustrated in FIG. 3.

The subassembly is turned over top to bottom and secured in the jig again with the unsealed edges of the battery separator walls adjacent the strengthening members 10 and 11. This is most easily accomplished with the base 16 of the jig resting against a table. The base 23 of the battery separator of the subassembly is placed against base 16 of the jig and the edges of the separator and of the jig are aligned and the C-clamp is again secured in position. The strengthening members 10 and 11 are thus again adjacent the edge of the separator that is to be filled in with foam bead 19. The process of applying the foamed bead is repeated in exactly the same manner previously described. The bead is then pressed and tamped against a table surface in the same manner as previously described and afterwards the active foam member is cooled. Then the C-clamp is removed and any flash is cut from the edges of the battery separator as illustrated in FIG. 3 and the envelope is thus completed.

As may be seen in FIG. 2 the foam extends down along the edge of the battery plate for about ¼ of an inch and around the end of the outer rib on each wall. As may be seen the rib spaces the battery separator's main web portion away from the battery plate. The paste support mat (which is not shown) is against the battery plate and in general the foam flows to the outside of this pushing it more tightly against the battery plate. The foam may extend in thickness of less than 1/32 of an inch over the outer edges 20 and 21 of the battery separator walls 30 and 31. In many instances the edges 20 and 21 of the battery separator extend wholly to the table surface 27. The foam should not extend beyond a thickness of 1/32 inch because it could interfer with the envelope's insertion into the tight confines of a battery case.

If with great difficulty some of the foam is pulled away from the separator little fuzzy fibrils are present on the foam clearly evidencing that the polyethylene is in secure mechanical adhesion with the battery separator which has pores having average pore sizes of about 0.03 microns. The paste support mats are locked in so securly that they cannot be removed without tearing them and it is very difficult to remove the battery plate from the envelope. This provides good handling qualities to the enveloped battery plate and also should reduce abrasion and other shifting damage to the battery plate and the battery separator during their operation in a battery and during shipping and handling prior to installation in a battery.

EXAMPLE II

The process of Example I is repeated except that a mandrel having the following deminsions is used in place of the battery plate. The mandrel is 18 inches in length, 5 13/16 inches in height and ⅜ inches thick and made out of stainless steel. The paste support mats are also omitted. In all other respects the process is carried out in exactly the same manner. The foam bead is stopped at the end of the length of the battery separator. After the trimming as shown in FIG. 3 the mandrel is removed from the envelope and the envelope is then ready for receipt of a battery plate at some future time.

EXAMPLE III

The procedure of Example I and II are combined. One side of the battery separator envelope is sealed as in Example II using a mandrel that is not a battery plate. This seal is cooled and any flash is trimmed to provide an intermediate battery separator envelope. The mandrel is then removed and a battery plate, with the paste support mats over each face, is positioned through the still open side before the battery separator is placed back in the jig 9. Then the procedure continues as in Example I. The paste support mats are bonded with the foam on only one side.

The advantage of the procedure of Example III is that the mandrel may be much lighter than the battery plate and consequently is easier to position and retain in position while the first seal is formed. The battery plate, particularly when covered with paste support mats which can wrinkle up, is more easily inserted through the open side. The already formed seal positions and supports the heavy battery plate in position in the battery separator and while the subassembly is being reassembled for receipt of the second seal to complete a two part foam member. In some instances there is a paste support mat that is folded or wrapped around the battery plate rather than being two discrete sheets or mats. There are other combinations such as discrete paste support mats overwrapped with a wrap around paste support mat.

In addition to the advantages and results which may be seen from the previous description, several features are believed to deserve special comment. The use of foam as a sealing material has the surprising feature of reducing the total outer deminsions of the envelope as compared with previous seals in those instances which required some short of lapping or overlapping of edges of the battery separators. Obviously the smaller the space consumed by the envelope itself the greater the space available in the battery case for the power elements. The foam also seems to have particular advantages in pushing polyethylene material into the crevices of the battery separators and is believed even into the pores giving superior mechanical adhesion as well as extending into any other types of voids and leaving no pockets unsealed. In addition, because the total amount of material required is less there is less total heat supplied against the separator. Heat tends to significantly degrade the battery separator. This more than offsets any resulting effect that the foam has on heat retention. Most surprising of all is the fact that the seal has been far stronger than previous adhesive seals and ultrasonic seals. Furthermore, the stresses toward opening up at the junctures appear to be very minimal. There just does not appear to be much strain on the joints even though the battery plates are quite heavy. The battery plate described in Example 1 weighs 9 pounds.

One of the advantages of the foam member envelope is the elimination of the problem of bringing the surfaces together during sealing or adhering and holding them during setting. With the foam bead, the foam expands to the surfaces rather than the surfaces going to an adhesive position. The mere holding of the walls in distorted position, in and of itself, produces stress in the battery separator.

Even more important is the distribution of the stress forces provided by the preferred form of the invention wherein the battery separator walls that join with the foam member are straight or planar in the region where they join the foam member. When the battery plates (particularly severe when the negative plate is employed) expand due to cycling over a period of time the internal pressure stretching the envelope is distributed throughout the flat envelope wall rather than being much more concentrated at a region that bends over the edge of the battery plate. Mechanical stress can be very damaging to the life of the battery separator because of the corrosive environment of the battery, which will typically lead to failure or cracking of the separator at the points of maximum stress.

The foam serves as a structural member, an adhesive that doesn't need clamping and a sealant.

It will be obvious to those skilled in the art that various changes and modifications may be made in the invention without departing from its true spirit and scope. It is, therefore, aimed in the appended claims to cover all such equivalent variations as fall within the true spirit and scope of the invention.

What we claim is:

1. The method of forming battery separator envelopes for battery plates comprising positioning two walls of porous battery separator adjacent to one another and spaced from one another by a mandrel which stops short of their outer edges in at least one region leaving a channel, securing rigid supporting members extending along the outer edges of said two walls of porous battery separator on their sides opposite said mandrel and adjacent to said channel, and thereafter extruding a bead of a foamable thermoplastic resin composition into said channel between said adjacent walls while not confining said bead along at least one of its expanding surfaces during at least part of its active placement, said bead expanding into direct secure engagement with said porous adjacent walls and forming a wall that is free standing on at least one side.

2. The method of claim 1 wherein said two walls of said porous battery separator are comprised on the same sheet which is folded with a base portion and said channel extends from said base portion and said bead is applied from an extruder die into said channel beginning at one end of the channel and moving in a substantially straight line to the other end of said channel and said method further comprising pressing said bead into said channel and smoothing the surface of said bead exposed at the surface of the channel.

3. The method of claim 1 wherein said mandrel is the battery plate that is to be enveloped.

4. The method of claim 3 wherein said battery plate has a frame extending therearound enclosing the battery grid which is pasted with battery paste with two outwardly disposed faces exposed for battery electrolyte and a paste support mat covers each of the two pasted faces of the battery plate and said method further comprising engaging said bead with the edge of said support mat with said bead extending through the interstices of the edge thereof.

5. The method of claim 1 wherein said thermoplastic resin of said composition is a polyolefin.

6. The method of claim 1 wherein said mandrel is rectangular and relatively flat with narrow edges and has two outwardly disposed rectangular faces and said two walls of porous battery separator extend parallel to one another and completely cover and extend beyond the faces of said mandrel with the exception of any projecting member that may be present, and said rigid supporting members are of at least substantially the same linear dimension as said two walls of porous battery separator and interconnected so that they can be clamped in engagement with said porous battery separator walls in alignment with the edges of said porous battery separator walls to support the walls in said parallel position and trapped against the mandrel to form a firm assembly with them and the mandrel for receiving said bead and said method further comprising pressing said bead into said channel and smoothing the surfaces of said bead exposed at the surface of the channel.

7. The method of claim 6 wherein said bead is applied from an extruder die into said channel beginning at one end of said channel and moving in a substantially straight line to the other end by moving said assembly past said extruder die.

8. The method of claim 6 wherein said foamable thermoplastic resin composition is comprised of a polyethylene compounded with a heat activated blowing agent and is extruded at a temperature in excess of 300° F from a die outlet and said porous battery separator has pores averaging less than 0.07 microns and the resultant foamed polyethylene is bonded tightly with said porous surfaces.

* * * * *